(12) United States Patent
Dobrev et al.

(10) Patent No.: US 7,713,397 B2
(45) Date of Patent: May 11, 2010

(54) METHOD FOR THE PRODUCTION OF A METAL MEMBRANE FILTER

(75) Inventors: Dobri Dobrev, Darmstadt (DE); Johann Vetter, Darmstadt (DE); Reinhard Neumann, Darmstadt (DE); Norbert Angert, Darmstadt (DE)

(73) Assignee: Gesellschaft fuer Schwerionen forschung mbH, Darmstadt (DE)

( * ) Notice: Subject to any disclaimer, the term of this patent is extended or adjusted under 35 U.S.C. 154(b) by 257 days.

(21) Appl. No.: 11/891,124

(22) Filed: Aug. 9, 2007

(65) Prior Publication Data

US 2008/0023337 A1 Jan. 31, 2008

Related U.S. Application Data

(62) Division of application No. 10/331,278, filed on Dec. 30, 2002, now abandoned.

(30) Foreign Application Priority Data

Dec. 31, 2001 (DE) ................. 101 64 214

(51) Int. Cl.
*C25D 1/00* (2006.01)
*C25D 1/08* (2006.01)
(52) U.S. Cl. .................. 205/75; 205/148; 205/150; 205/165; 205/205
(58) Field of Classification Search ........... 205/75, 205/150
See application file for complete search history.

(56) References Cited

U.S. PATENT DOCUMENTS

| 4,397,715 | A | | 8/1983 | Mohan et al. |
| 4,496,434 | A | | 1/1985 | Morssinkhof |
| 4,575,406 | A | | 3/1986 | Slafer |
| 5,240,587 | A | | 8/1993 | Maner |
| 5,632,878 | A | * | 5/1997 | Kitano ................. 205/70 |

FOREIGN PATENT DOCUMENTS

| DE | 36 31 804 A1 | 9/1986 |
| DE | 198 12 850 A1 | 3/1998 |
| EP | 0 252 545 B1 | 1/1988 |

* cited by examiner

*Primary Examiner*—Patrick Ryan
*Assistant Examiner*—William T Leader
(74) *Attorney, Agent, or Firm*—Frommer, Lawrence & Haug LLP; Ronald R. Santucci

(57) ABSTRACT

The invention relates to a metal membrane filter (1) and to a method and apparatus for the production thereof. The metal membrane filter (1) has rectilinear, cylindrical filter pores (2), which are arranged statistically distributed on the metal membrane filter surface (3) in a density of from a single filter pore (2) per $cm^2$ up to $10^7$ filter pores (2) per $cm^2$. The average diameter of the filter pores (2) is uniform for all filter pores (2) and is from a few tens of nm up to several micrometers. The metal membrane filter (1) comprises a metal electro-deposited with rectilinear, cylindrical filter pores (2) or a correspondingly electro-deposited metal alloy.

16 Claims, 3 Drawing Sheets

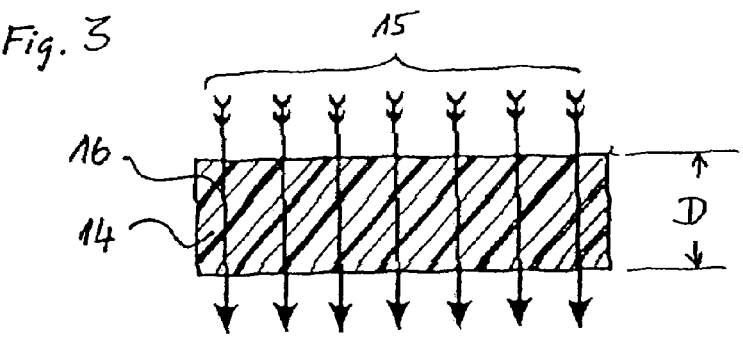
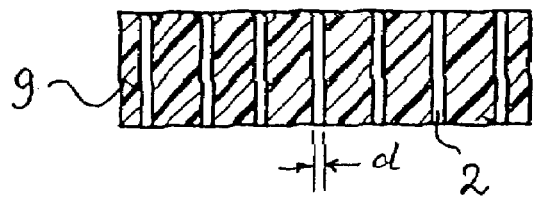
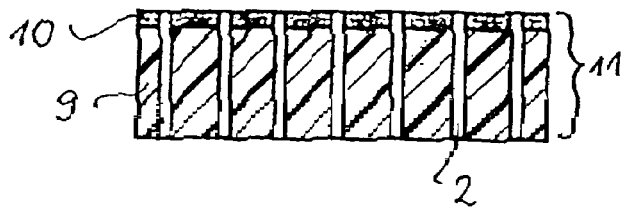
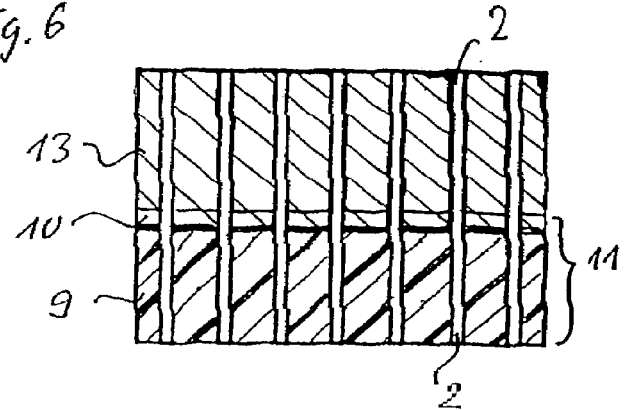
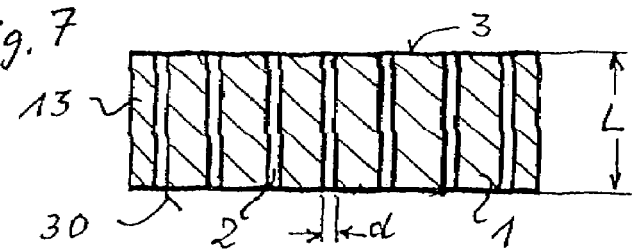

METHOD FOR THE PRODUCTION OF A METAL MEMBRANE FILTER

CROSS-REFERENCE TO RELATED APPLICATIONS

This application is a division of U.S. patent application Ser. No. 10/331,278 filed Dec. 30, 2002, now abandoned, entitled "Metal Membrane Filter, and Method and Apparatus for the Production Thereof" which claims priority benefits of German Patent Application No. DE 101 64 214.8 filed Dec. 31, 2001.

The invention relates to a metal membrane filter and to a method and apparatus for the production thereof, in accordance with the preambles of the independent claims.

Plastics membrane filters having small pores are produced from plastics films by bombarding the plastics films with ion beams. Such bombardment results in discrete ion beam tracks, which can subsequently be dissolved out from the plastics film so that filter pores of uniform diameter are formed and the plastics membrane filters can be used for separating particles of defined average diameter. That method cannot, however, be applied to metal foils or metal membranes because, on passing through thin metal foils, ion tracks do not leave behind ion tracks that can be etched out as in the case of plastics films.

The problem of the invention is to provide a metal membrane filter, and a method and apparatus for the production thereof, which metal membrane filter corresponds geometrically to a plastics membrane filter formed by means of an ion beam and a technique of dissolving out the ion beam tracks, wherein the method should transfer the structure of a plastics membrane filter to a metal membrane filter at reasonable cost and wherein the apparatus for the production thereof should be capable of rapid adaptation to different metal membrane filter materials.

The problem is solved by the subject-matter of the independent claims. Advantageous developments of the invention are given in the subordinate claims.

The invention provides a metal membrane filter having rectilinear, cylindrical filter pores which are arranged statistically distributed on the metal membrane filter surface in a density of from a single filter pore per $cm^2$ up to $10^7$ filter pores per $cm^2$. The average diameter can be set from a few tens of nanometers up to several micrometers for all pores of the metal membrane filter, the metal membrane filter comprising a metal electro-deposited with rectilinear, cylindrical filter pores or a correspondingly electro-deposited metal alloy.

Such filter pores electro-deposited in rectilinear and cylindrical form are distinguished by a smooth internal wall structure which cannot be attained with an etching technique because of the isotropic advance of the etching front in a metal membrane. Such rectilinear, cylindrical filter pores having smooth internal walls formed by electro-deposition have the advantage, moreover, that a clear-cut selection of specified particle size can be achieved by means of these metal membrane filters. Furthermore, the fine-crystalline structure of an electro-deposited metal membrane filter results in the advantage of the metal membrane filters having a high degree of resilience and a high degree of resistance to erosion and consequently in such filters having an extended life in operation and use.

A preferred embodiment of the metal membrane filter comprises a nickel, copper, gold or platinum electro-deposited with rectilinear, cylindrical filter pores or correspondingly deposited alloys thereof, the high resistance to corrosion, oxidation and erosion in the case of the precious metals gold and platinum being well-known, whereas in the case of the less precious metals copper and nickel the low costs are highly advantageous.

In a further preferred embodiment of the invention, the filter pores have on one side, the top side, a rounded-off or conical aperture-rim and, on the reverse side located opposite, a sharp-edged aperture-rim. This formation is achieved by means of the fact that the reverse side is so polished, after the metal membrane filter has been produced, that a sharp-edged transition from the reverse-side plane to the rectilinear and cylindrical filter pores is brought about. The aperture located opposite the reverse side has a rounded-off or conical aperture-rim, which can be influenced by means of the electro-deposition parameters.

A method for the production of a metal membrane filter can comprise the following method steps. First, a plastics membrane filter having filter pores is produced. Then, on one side of that plastics membrane filter having filter pores, there is deposited an electrically conductive layer, as a result of which a metal-coated plastics membrane filter is formed, the metal layer being so thin that the aperture-rims are sharply delineated on the plastics membrane filter. On subsequent electro-deposition of a metal membrane filter body, a liquid that is inactive with respect to electro-deposition is caused to flow through the filter pores of the metal-coated plastics membrane filter, the direction of flow being set from the uncoated side to the coated side of the metal-coated plastics membrane filter. As a result, the filter pores are kept clear during electro-deposition of a metal membrane filter body and do not close up. The consequence of a liquid that is inactive with respect to electro-deposition flowing through the filter pores is that there is a substantial increase in electrochemical polarisation in the vicinity of the pore apertures. The liquid is therefore subjected to a certain amount of positive pressure from the non-metal-coated side of the plastics membrane.

In a preferred means of implementing the method, pure water or the inert electrolyte, passing through the pores, is brought into contact with the internal walls of the pores so that the ion concentration is reduced in the vicinity of the pore apertures and the concentration polarisation is increased. It is also possible to use solutions comprising ions of a kind that form complexes with the metal ions and, by that means, bring about substantial differences in the deposition potential in the vicinity of the pore apertures and on the surface of the metal coatings. A further possibility for the liquids flowing through comprises the use of very low concentrations of specifically adsorbing substances, as a result of which deposition around the pore apertures is prevented.

It is consequently made possible, by means of this method, for the structure of the plastics membrane filter to be practically copied by a metal membrane filter body being formed. After a desired thickness of metal membrane filter body has been achieved, which can be between 10 and 200 µm, the plastics membrane filter is dissolved away from the metal membrane filter and, consequently, a functional, highly resilient and mechanically resistant metal membrane filter is made available.

In a further preferred implementation example of the method, for the production of a plastics membrane filter, a plastics film is first irradiated with an ion beam. This plastics film consists preferably of a polycarbonate such as a polybisphenolcarbonate. Carbonates of that kind have the advantage that the capacity for dissolution in methanol is greatly increased once a heavy ion beam has passed through the plastics material. The plastics film itself has a thickness of preferably from 30 to 150 µm, with preference being given to a small thickness of about 30 µm for small pore diameters of a few tens of nanometers, whereas a thickness of from 100 to 150 µm is used for larger diameters in the micrometer range.

In order to produce such ion tracks in a plastics film, preference is given to accelerating ion beams comprising $U^{238}$ ions to a kinetic energy of from 10 to 15 MeV/u and then directing them at the plastics film, resulting in, statistically distributed on the irradiated surface of the plastics film, an adjustable or predetermined ion beam track density, which is the precondition for a corresponding, rectilinear, cylindrical filter pore density.

In order to produce rectilinear, cylindrical filter pores from the ion beam tracks in the plastics film, the irradiated plastics film is, in a preferred embodiment of the invention, treated at room temperature with a solution of 6M sodium hydroxide solution mixed with up to 10% methanol, whereupon filter pores of entirely uniform diameter form along the ion beam tracks.

The deposition of an electrically conductive layer on one side of the plastics membrane filter so formed can be carried out by means of powder deposition methods, also designated "sputtering". In such a powder deposition method, a metal, which preferably corresponds to the metal of the metal membrane filter to be formed, is atomised by means of electrons or an ion beam and is deposited on the upper surface of the plastics membrane filter. In the case of such powder deposition, it is highly possible that the internal walls of the plastics filter pores will also be partly coated so that, after the plastics membrane filter has been dissolved away from the metal membrane filter, the metal membrane filter will have ring-shaped projections on its underside, which can be removed by means of a simple polishing step. At the same time, this polishing step results in sharp-edged aperture-rims for the filter pores on the reverse side of the metal membrane filter.

During electro-deposition of a metal membrane filter body on the coated side of the plastics membrane filter, the flow of inactive liquid through the filter pores is maintained by means of a hydrostatic positive pressure of between 100 Pa and 1000 Pa. Preferred liquids made available on the reverse, or uncoated, side of the plastics membrane filter under positive pressure are pure water, sulphuric acid, sulphurous acid, ethylenediaminetetraacetic acid or mixtures thereof.

In the electro-deposition of a metal membrane filter body of gold or a gold alloy on the metal-coated plastics membrane filter, a gold sulphite bath containing from 10 mg to 15 mg of gold or gold alloy per $cm^3$ is used at a bath temperature of between 20 and 60° C. This has the advantage that a fine-structured gold foil having corresponding filter pores is formed on the metal-coated plastics membrane filter.

In a further implementation example of the method, in the electro-deposition of a metal membrane filter body of platinum or a platinum alloy on the metal-coated plastics membrane filter, an acid or alkaline platinum bath containing from 1 mg to 20 mg of platinum or platinum alloy per $cm^3$ is used, the low concentrations of platinum in the platinum bath being used especially in the case of acid platinum baths and the high concentrations of platinum in the electrolyte bath being advantageous when an alkaline platinum bath is employed.

In a further implementation example of the method, in the electro-deposition of a metal membrane filter body of copper or a copper alloy on the metal-coated plastics membrane filter, a copper sulphate bath is used at a bath temperature of between 20 and 60° C. and a current density of between 20 $mA/cm^2$ and 60 $mA/cm^2$. In relation to the current densities used for platinum or gold, the current densities for copper are relatively high so that it is possible for thicker metal membrane filter bodies and, therefore, thicker metal membrane filters to be produced in a substantially shorter time.

Finally, in a further implementation example of the method of the invention, in the electro-deposition of a metal membrane filter body of nickel or a nickel alloy, a nickel sulphamate bath is used at a bath temperature of between 40 and 60° C. and a current density of between 15 $mA/cm^2$ and 25 $mA/cm^2$. Using those parameters, it is possible to produce nickel membrane filters that are distinguished by their high resistance to erosion and to oxidation.

For dissolving the plastics membrane filter away from the metal membrane filter body in order to produce a metal membrane filter, the use of dichloromethane has proved advantageous when the plastics material is a polycarbonate.

As already mentioned hereinbefore, the reverse side of the metal membrane filter can subsequently be mechanically polished after dissolving away the plastics membrane filter, in order to remove, for example, undesirable projections produced in the filter pores during powder deposition of the metal deposited on the plastics membrane filter.

A further aspect of the invention relates to an apparatus for the production of a metal membrane filter. An apparatus of this kind has a vessel for accommodating an electro-deposition bath. The vessel is provided with an anode, which can be introduced into the electro-deposition bath by means of a removable cover. In its bottom region, the vessel has a holder, under cathode potential, for a metallic plastics membrane filter. Arranged upstream of that holder is a pressure inlet (connected to a pressure vessel by way of a shut-off valve) for a liquid which is inactive with respect to electro-deposition. The pressure vessel itself is so arranged that its height is adjustable with respect to the vessel containing the electro-deposition bath so that a specified head of pressure can be maintained. The range of positive pressure adjustability is between 100 and 1000 Pa, which corresponds to a difference in height of about from 10 to 100 mm between the level of liquid in the pressure vessel and the level of liquid in the electro-deposition bath.

In order to keep the concentration of metal ions in the electro-deposition bath uniform, the anode can, in a preferred embodiment of the apparatus, comprise gold, platinum, copper, nickel or alloys thereof. In addition to the pressure vessel and the vessel for the electro-deposition bath, the apparatus is provided with a direct-current source for an adjustable cathode current density of between 10 $mA/cm^2$ and 100 $mA/cm^2$. That cathode current density range is sufficient for application of the different metal membrane filter materials onto the metal-coated plastics membrane filters.

In summary, it can be stated that, using the present apparatus, it is possible to produce metal membrane filters having filter pores with the following properties, namely filter pores which can be produced having a rectilinear and cylindrical formation with relatively smooth internal walls and with diameters of from a few tens of nanometers to several micrometers, as desired, and with area densities of from just 1 pore per $cm^2$ to $10^7$ pores per $cm^2$, as desired. In addition, the method and apparatus have the advantage that a metal membrane filter is made possible by means of direct electrochemical or electro-deposition copy-forming of filter pores from an ion track polymer membrane.

A comparable result could otherwise be achieved only by means of a much more complex method comprising at least two copy-forming steps. It is conceivable, for example, that, in order to produce microstructures, first the pores of etched-out ion tracks in the polymer films are filled with metal and, at the same time, a carrier layer for the fine metal threads in the pores is deposited on one side. The original pore-containing plastics material can then be removed from such a structure, which can then be copy-formed, using a second metallic material, to produce the metal membrane filter from the first copy-formed structure. Such double copy-forming would have the disadvantage that two different metals have to be used in succession, with the first metal structure having to be sacrificed in the course of the process.

A precondition for such a method is that the two metals should differ considerably in terms of their chemical properties in order for the first metal structure to be removed without damage to the second metal structure ultimately constituting the final membrane filter. In contrast to the present invention, after deposition of the first metal the original plastics membrane filter is dissolved away so that the arrangement thereby produced has thin parallel wires, which subsequently have to be copy-formed using the second metal. Copy-forming can, however, succeed only if the surface of the first metal is passivated, which is difficult, and in many cases almost impossible, because of the very small wire dimensions of from a few tens of nanometers up to several μm.

Instead of the sputtering mentioned hereinbefore, the plastics membrane filter can also be provided with a thin metal coating by means of vapour deposition. Were it not for the inventive concept of flow through the filter pores during electro-deposition, the filter pores would close up during electro-mechanical deposition on the conductive side of the starting structure, located opposite the anode, as soon as a limited thickness had been reached. By means of the present invention, however, the pore apertures are kept clear so that rectilinear, cylindrical filter pores can be formed in the electro-deposition material.

The present method according to the invention has, moreover, the advantage that it can be applied simply and without any great difficulty, no complicated apparatus or other equipment is required, and suitable metal membrane filters can be produced from any desired metal capable of electro-chemical deposition.

The invention will now be described in greater detail on the basis of embodiments with reference to the accompanying drawings.

FIGS. 3 to 7 show method steps in the course of production of a metal membrane filter.

Figure 1:
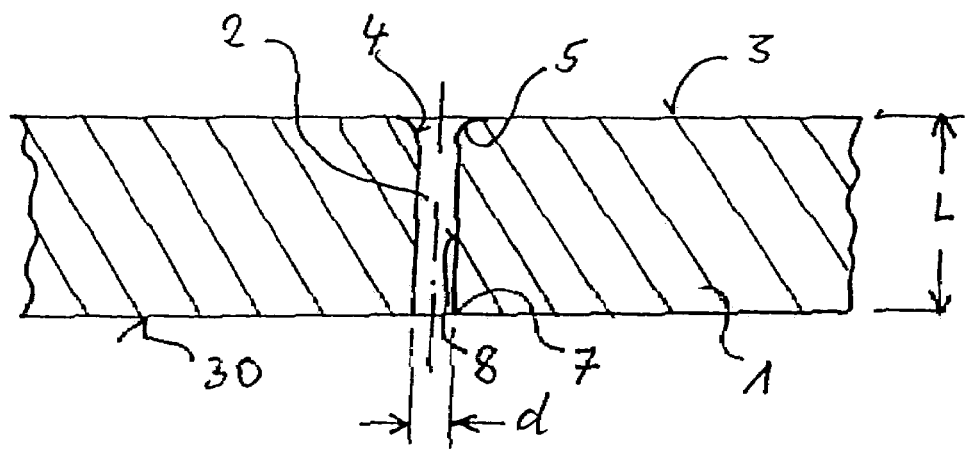
FIG. 1 shows, in diagrammatic form, a cross-section through a portion of a metal membrane filter having a filter pore.

FIG. 1 shows, in diagrammatic form, a cross-section through a portion of a metal membrane filter 1 having a filter pore 2. Reference numeral 3 denotes a metal membrane filter surface, it being possible for the density of the filter pores 2 to be between a single filter pore per $cm^2$ up to $10^7$ filter pores per $cm^2$ of metal membrane filter surface 3. Reference numeral 4 denotes the top of the filter pore 2, which in the embodiment according to FIG. 1 has a rounded-off aperture-rim 5. The filter pore 2 extends from the metal membrane filter surface 3 to the reverse side 30 of the metal membrane filter and has a rectilinear and cylindrical form with smooth internal walls 8, the thickness L of the metal membrane filter being between 5 μm and 200 μm, preferably between 8 μm and 50 μm.

The diameter d of the filter pore 2 is between a few tens of nanometers and several micrometers. Reference numeral 7 denotes a sharp-edged aperture-rim on the reverse side of the filter pore 2. That sharp-edge aperture-rim 7 is achieved by polishing the reverse side 30 of the metal membrane filter 1. The material of the metal membrane filter 1 consists preferably of gold, platinum, copper, nickel or alloys thereof. A precious metal embodiment in gold was produced at room temperature in a thickness of from 10 to 12 μm. By way of comparison, a further metal membrane filter was produced from gold at 55° C., which differed from the metal membrane filter produced at room temperature in that it had better ductility. The positive pressure for the liquid that is inactive with respect to electro-deposition, for which water was used in this instance, was set at 100 Pa.

In the case of deposition of a metal membrane filter 1 from platinum, a higher hydrostatic pressure of about 300 Pa was set, with, on the one hand, an acidic platinum electrolyte being used, which yielded a brittle metal membrane filter and consequently limited the thickness to a few micrometers, the brittleness being attributable to a high degree of hydrogen inclusion.

A metal membrane filter 1 of platinum was grown from an alkaline electrolyte, resulting in virtually no hydrogen inclusion in the deposited layer and in the membranes becoming extremely ductile. It was consequently possible to produce substantially thicker metal membrane filters 1, although increasing the temperature resulted in increasingly large crystallites within the deposited layer, which partially deformed the internal wall of the pores in the metal membrane filter 1.

Figure 2:
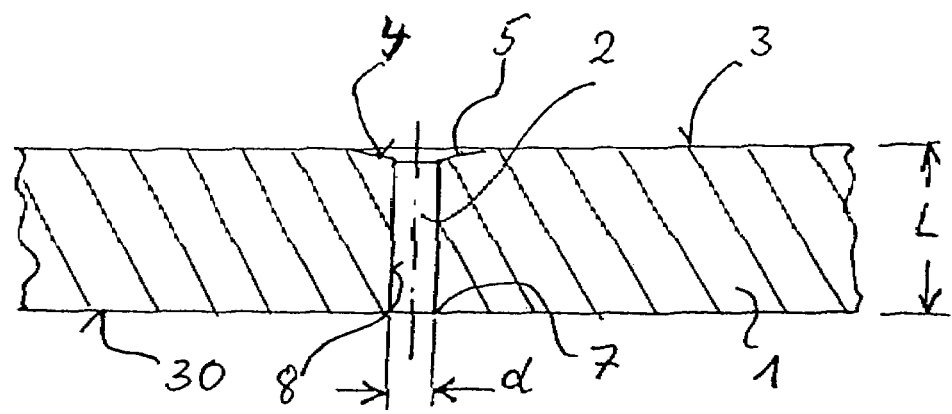
FIG. 2 shows, in diagrammatic form, a cross-section through a portion of a metal membrane filter having a further filter pore.

FIG. 2 shows, in diagrammatic form, a cross-section through a portion of the metal membrane filter 1 having a further filter pore 2. Components having the same functions as in FIG. 1 are denoted by the same reference symbols and are not additionally described.

The embodiment according to FIG. 2 differs from the embodiment according to FIG. 1 in that it has a conical aperture-rim 5 at the top 4 of the filter pore 2. A flat cone of that kind at the aperture-rim 5 of the filter pore 2 can be achieved by varying the speed of flow through the filter pore 2 during production of the metal membrane filter 1. In this embodiment according to FIG. 2 the reverse side of the metal membrane filter 1 is also polished in order to level off ring-shaped projections at the aperture-rim 7 on the reverse side 6 of the filter pore 2. Neither FIG. 1 nor FIG. 2 are true to scale but rather they are to an extremely enlarged scale in order to show the shape of the filter pores 2. In particular, in FIGS. 1 and 2, the filter pore diameter d has been drawn to an exaggeratedly large scale in relation to the thickness L of the metal membrane filter 1.

In the embodiment according to FIG. 2, metal membrane filters 1 were produced from non-precious metals such as copper and nickel. In the case of a copper membrane filter, 25% sulphuric acid was used as the liquid that is inactive with respect to electro-deposition, at a hydrostatic pressure of 350 Pa. In the course of a deposition period of 30 minutes at room temperature, a thickness L of 20 μm can be achieved. Furthermore, metal membrane filters 1 can be produced using a liquid that is inactive with respect to electro-deposition which consists of pure water, at a hydrostatic pressure of 1000 Pa and 500 Pa, the greater water flow at 1000 Pa producing more regular cylindrical filter pores. However, the surface of the metal membrane filter is rougher because of the dilution of the electrolyte along the cathode.

If the hydrostatic pressure is too low, below 100 Pa, some of the filter pores become filled with metal so that in some cases pores that are not continuously open are produced. It has been found that, if a very small amount of ethylenediaminetetraacetic acid is mixed in, there are formed, around the filter pore apertures, copper complexes that increase the chemical polarisation, the metal not being reduced at the voltages applied and, consequently, better filter pore quality is achieved. By similar means to metal membrane filters of copper, it is also possible to produce metal membrane filters 1 of nickel, a thickness L of 10 μm being achieved in a nickel sulphamate bath at 55° C. and at a positive pressure of 1000 Pa.

FIGS. 3 to 7 show method steps in the course of the production of a metal membrane filter 1. Components having the same functions as in the previous Figures are denoted by the same reference symbols and are not additionally described.

FIG. 3 shows, in diagrammatic form, a cross-section through a portion of a plastics film 14, through which there are passing $U^{238}$ ions of an ion beam 15. Reference numeral 16 denotes an ion track, which extends in a straight line through the polymeric plastics film of polycarbonate. The material in the region of the ion beam tracks is dissolved out from the film, for example using a 6M sodium hydroxide solution containing 10% methanol.

FIG. 4 shows, in diagrammatic, cross-sectional form, the result of dissolving out the ion tracks of FIG. 3. Rectilinear, cylindrical filter pores are produced, which extend straight across the plastics material so that a plastics membrane filter is formed.

FIG. 5 shows, in diagrammatic form, a cross-section through the plastics membrane filter of FIG. 4 having an electrically conductive metal layer 10. The electrically conductive metal layer 10 is necessary because the plastics membrane filter surface is not suitable for electro-deposition. For that reason, a metal layer 10 of the metal of the future metal membrane filter is first applied to the plastics by sputtering or vapour deposition. In the process, the filter pores 2 may also become partly coated, which can result in the formation of ring-shaped projections on the reverse side of the metal membrane filter to be formed. Such ring-shaped or hollow cylindrical projections can, however, be leveled, after dissolving away the plastics membrane filter, by polishing the reverse side of the metal membrane filter.

FIG. 6 shows, in diagrammatic cross-sectional form, how the filter pores 2 of the plastics membrane filter are continued in an electro-deposition metal membrane filter on the metallic layer 10, if continuous flow through the filter pores is ensured during electro-deposition. For copper, that deposition is carried out at room temperature using a current density of, for example, 4 A/dm², whereas for gold membrane filters a gold sulphite bath is used, which is operated, for example, with 12.5 g of gold per liter at a current density of 0.4 A/dm² at room temperature. Platinum deposition can be carried out, as already mentioned hereinbefore, either in an acid platinum bath, containing 2 g of platinum per liter, or in an alkaline platinum bath, containing 15 g of platinum per liter, the respective current densities corresponding to 2 A/dm² and 1 A/dm². Finally, nickel can be electro-deposition at a temperature of 55° C. from a nickel sulphamate bath at a constant current density of 20 A/dm² so that the metal membrane filter body 13 in FIG. 6 is formed, which is still connected to the plastics metal filter by way of the deposited metal layer 10.

FIG. 7 shows, in diagrammatic form, a cross-section through a metal membrane filter 1, the plastics film having been removed in the meantime. For removal of the plastics film, a dichloromethane is used so that, afterwards, a self-supporting metal membrane filter is available.

Figure 8:
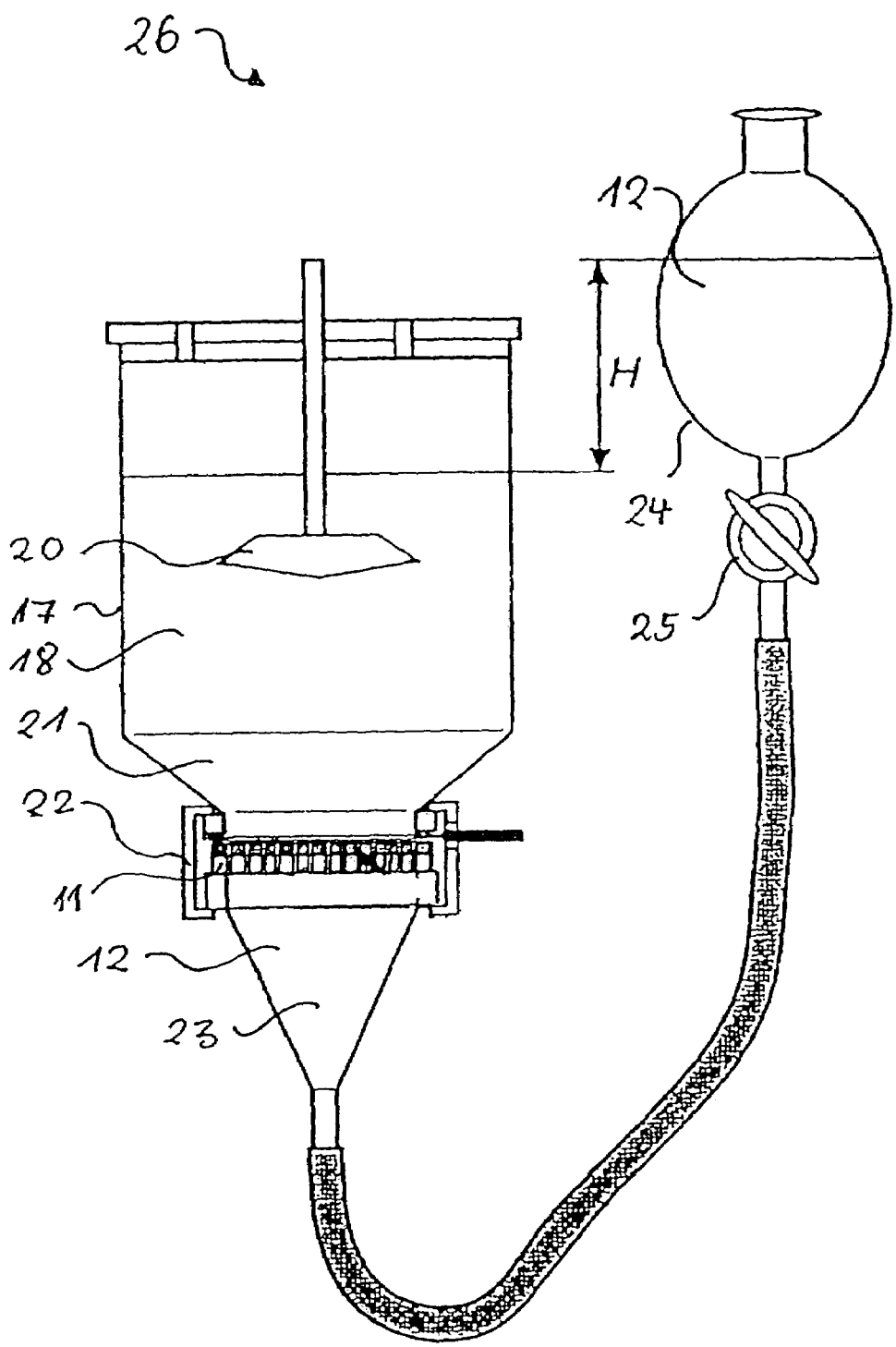
FIG. 8 is a schematic diagram of an apparatus for the production of a metal membrane filter.

FIG. 8 is a schematic diagram of an apparatus 26 for the production of a metal membrane filter. Components having the same functions as in the previous Figures are denoted by the same reference symbols and are not additionally described.

Reference numeral 17 denotes a vessel which can accommodate an electro-deposition bath 18. An anode 20, which is held by a vessel cover 19 in electrically isolated manner, extends into the electro-deposition bath 18. In the bottom region 21 of the vessel 17 there is arranged a holder 22, which holds the plastics membrane filter, coated with an electrically conductive layer, in such a way that the electrically conductive coating of the plastics membrane filter is oriented towards the anode. In addition, the holder 22 holds a pressure inlet 23 filled with a liquid 12 that is inactive with respect to electro-deposition, which pressure inlet is of funnel-shaped construction so that the liquid 12 that is inactive with respect to electro-deposition, uniformly distributed over the underside of the plastics membrane filter, can push through the filter pores distributed on the top of the membrane filter.

The pressure inlet is connected, by way of a flexible hose, to a pressure vessel 24, which has, in its bottom region, a shut-off valve 25, which ensures that, on setting up of the deposition current density in the electro-deposition bath 18, a hydrostatic positive pressure resulting from opening of the shut-off valve 25 ensures continuous flow through the filter pores.

The level, in the pressure vessel 24, of the liquid 12 that is inactive with respect to electro-deposition is arranged to be higher, by the height difference H, than the level of the electro-deposition bath 18. That height difference H can be varied by vertical displacement of the pressure vessel 24. The shut-off valve 25 is arranged below the level of the electro-deposition bath 18. The material of the anode is matched to suit the material being deposited for the metal membrane filter. The anode therefore comprises either gold, platinum, copper, nickel or another electrolytically depositable metal so that alloys of the mentioned metals are also included. In the cases of copper, nickel and gold, a sulphuric acid or sulphurous acid is used as electrolyte, whereas alkaline electrolytes also come into consideration for the deposition of platinum, especially as acid electro-deposition baths tend to incorporate hydrogen in the deposited platinum, which makes the platinum metal and, consequently, the metal membrane filter brittle.

LIST OF REFERENCE SYMBOLS 1 metal membrane filter
2 filter pores
3 metal membrane filter surface
4 top of filter pore
5 rounded-off aperture-rim of filter pore
6 reverse side of filter pore
7 sharp-edged aperture-rim of filter pore
8 internal wall structure of filter pore
9 plastics membrane filter
10 electrically conductive layer
11 metal-coated plastics membrane filter
12 liquid that is inactive with respect to electro-deposition
13 metal membrane filter body
14 plastics film
15 ion beam
16 ion beam tracks
17 vessel
18 electro-deposition bath
19 cover
20 anode
21 bottom region
22 holder
23 pressure inlet
24 pressure vessel
25 shut-off valve 26 apparatus
30 reverse side of metal membrane filter
31 cathode
32 flexible hose
d average filter pore diameter
D thickness of plastics film
H height difference
L thickness of metal membrane filter

What is claimed is:

1. Method for the production of a metal membrane filter, comprising the following method steps:
   production of a plastics membrane filter (9) having filter pores (2),
   deposition, on one side of the plastics membrane filter (9), of an electrically conductive layer (10) to form a metal-coated plastics membrane filter (11),
   flow, through the filter pores (2) of the metal-coated plastics membrane filter (11), of a liquid (12) that is inactive with respect to electro-deposition from the uncoated to the coated side of the metal-coated plastics membrane filter (11); electro-deposition of a metal membrane filter body (13) onto the metal-coated plastics membrane filter (11).

2. Method according to claim 1, wherein, for production of a plastics membrane filter (9), a plastics film (14) is first irradiated with an ion beam (15).

3. Method according to claim 2, wherein the plastics film (14) comprises a polybiphenolcarbonate.

4. Method according to claim 2, wherein the plastics film (14) has a thickness (D) of from 30 to 150 micrometers.

5. Method according to claim 2, wherein the ion beam (15) comprises U238 ions, which are accelerated to a kinetic energy of from 10 to 15 MeV/u and form discrete ion beam tracks (16) in the plastics film (14).

6. Method according to claim 5, wherein, for production of the plastics membrane filter (9), the ion beam tracks (16) in the plastics film (14) are dissolved to form rectilinear, cylindrical filter pores (2) using a solution of 6M sodium hydroxide solution mixed with up to 10% methanol at room temperature.

7. Method according to claim 2, wherein, on electro-deposition of a metal membrane filter body (13) of gold or a gold alloy onto the metal-coated plastics membrane filter (11), a gold sulphite bath containing from 10 mg to 15 mg of gold or gold alloy per cm$^3$ is used at a bath temperature of between 20 and 60° C.

8. Method according to claim 2, wherein the plastics membrane filter (9) is removed from the metal membrane filter body (13) by dissolving away the plastics material in dichloromethane.

9. Method according to claim 1, wherein the deposition of an electrically conductive layer (10) on one side of the plastics membrane filter (9) to form a metal-coated plastics membrane filter (11) is carried out by means of powder deposition methods of sputtering.

10. Method according to claim 1, wherein, on deposition of an electrically conductive layer (10) on one side of the plastics membrane filter (9), a metal or metal alloy is deposited which corresponds to the metal material of the metal membrane filter.

11. Method according to claim 1, wherein, for flow, through the filter pores (2) of the metal-coated plastics membrane filter (11), of a liquid (12) that is inactive with respect to electro-deposition, from the uncoated to the coated side of the metal-coated plastics membrane filter, the liquid (12) that is inactive with respect to electro-deposition is subjected to a positive pressure on the uncoated side of the plastics membrane filter (9) of between 100 Pa and 1,000 Pa.

12. Method according to claim 1, wherein water, sulphuric acid, sulphurous acid, ethylenediaminetetraacetic acid or mixtures thereof are used as the liquid (12) that is inactive with respect to electro-deposition.

13. Method according to claim 1, wherein, on electro-deposition of a metal membrane filter body (13) of platinum or a platinum alloy onto the metal-coated plastics membrane filter (11), an acid or alkaline platinum bath containing from 1 mg to 20 mg of platinum or platinum alloy per cm$^3$ is used.

14. Method according to claim 1, wherein, on electro-deposition of a metal membrane filter body (13) of copper or a copper alloy on to the metal-coated plastics membrane filter (11), a copper sulphate bath is used at a bath temperature of between 20 and 60° C. and at a current density of between 20 mA/cm$^2$ and 60 mA/cm$^2$.

15. Method according to claim 1, wherein, on electro-deposition of a metal membrane filter body (13) of nickel or a nickel alloy onto the metal-coated plastics membrane filter (11), a nickel sulphamate bath is used at a bath temperature of between 40 and 60° C. and at a current density of between 15 mA/cm$^2$ and 25 mA/cm$^2$.

16. Method according to claim 1, wherein the plastics membrane filter (9) is removed from the metal membrane filter body (13) by dissolving away the plastics material in dichloromethane.

* * * * *